United States Patent
Hallock et al.

[15] 3,670,262
[45] June 13, 1972

[54] GAS LASER WITH DISCHARGE AND GAS RETURN PATHS THROUGH A COMMON CYLINDRICAL BODY

[72] Inventors: David D. Hallock, Palos Verdes Estates; Abel S. Halsted, Palos Verdes Peninsula, both of Calif.

[73] Assignee: Hughes Aircraft Company, Culver City, Calif.

[22] Filed: Oct. 2, 1970

[21] Appl. No.: 77,475

[52] U.S. Cl............................................331/94.5
[51] Int. Cl...............................................H01s 3/00
[58] Field of Search.................................331/94.5

[56] References Cited

UNITED STATES PATENTS

| | | |
|---|---|---|
| 3,586,996 | 6/1971 | Milochevitch et al. ...............331/94.5 |
| 3,427,564 | 2/1969 | Okaya et al............................331/94.5 |
| 3,437,950 | 4/1969 | Okaya et al............................331/94.5 |
| 3,452,295 | 6/1969 | Sher.......................................331/94.5 |
| 3,501,714 | 3/1970 | Myers et al. ..........................331/94.5 |
| 3,544,915 | 12/1970 | McMahan..............................331/94.5 |
| 3,555,450 | 1/1971 | Rockwell...............................331/94.5 |

OTHER PUBLICATIONS

Knudsen et al., " Argon Ion Lasers," Sperry Engineering Review, Vol. 19, No. 1, 1966, pp. 27–31.

*Primary Examiner*—Ronald L. Wibert
*Assistant Examiner*—Edward S. Bauer
*Attorney*—James K. Haskell and Paul M. Coble

[57] ABSTRACT

In the disclosed gas ion laser a plurality of axially aligned electrically insulating elongated cylindrical bodies are successively disposed between a cathode housing and an anode in hermetically bonded relationship with one another and with the cathode housing and the anode to form a laser gas containing hermetic enveloping assembly. The respective cylindrical bodies define aligned discharge confining axial longitudinal bores and aligned gas return off-axis longitudinal bores isolated from the discharge confining bores except in the vicinity of the cathode housing and in the vicinity of the anode. A coolant is passed in direct contact with the outer lateral surface of the bonded cylindrical bodies in an annular coolant flow channel between the outer lateral surface of the cylindrical bodies and an annular axial magnetic field generating arrangement coaxially disposed about the cylindrical bodies. Improved gas return flow at relatively low temperature results, enabling the achievement of high efficiency, high power laser operation.

3 Claims, 3 Drawing Figures

PATENTED JUN 13 1972
3,670,262
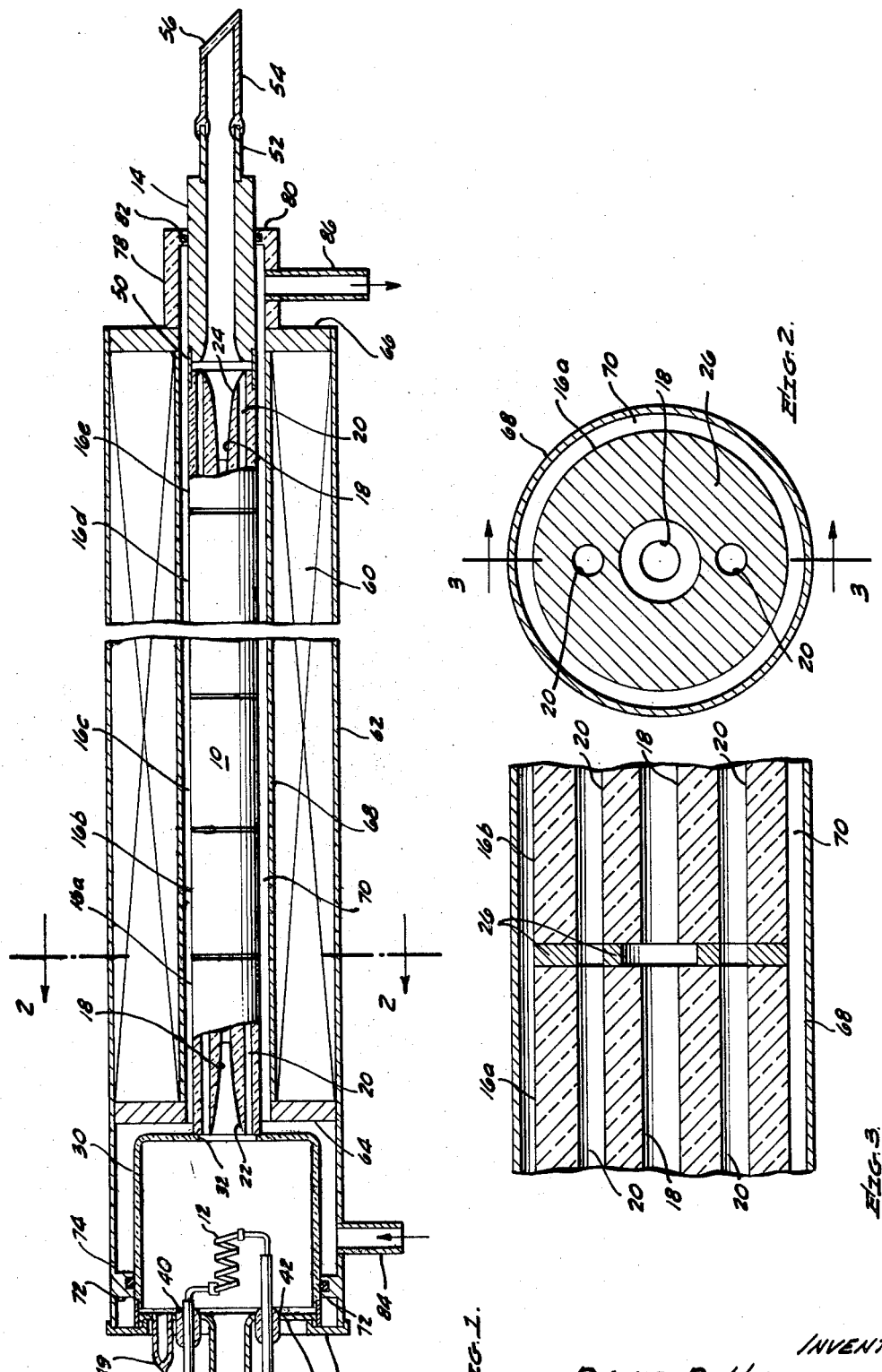
INVENTORS.
DAVID D. HALLOCK,
ABEL S. HALSTED,
BY Paul M. Cole
ATTORNEY.

GAS LASER WITH DISCHARGE AND GAS RETURN PATHS THROUGH A COMMON CYLINDRICAL BODY

This invention relates to lasers, and more particularly relates to a discharge excited gas ion laser having a combined discharge confining and hermetic enveloping body provided with an internal gas return path.

During the operation of gas ion lasers excited by a DC electrical discharge, laser gas is transferred between the cathode region and the anode region of the discharge tube, creating a pressure differential therebetween. Since optimum laser operation is achievable over relatively narrow ranges of gas pressure, the aforementioned gas movement results in a significant deterioration in the laser output and may even extinguish the laser action.

In one prior art arrangement which has been employed to solve this problem, a tube of high gas flow conductance is connected externally of the laser discharge tube between the anode and cathode regions of the tube to provide a gas return path which is removed from the discharge region. Although such external gas return tubes have essentially eliminated the aforementioned anode-cathode pressure differential and the resultant deterioration in laser performance, the external gas return arrangements are fragile, bulky and cumbersome.

In another gas ion laser arrangement according to the prior art, a plurality of discharge confining rings of a material such as tungsten or graphite are successively disposed within the vacuum enveloping laser tube, and a gas return path is provided either through off-axis holes in the confining rings or in space between the confining rings and the enveloping tube. Although such housed confining ring return flow arrangements are considerably more compact and durable than the external return tube arrangement, the gas flowing through or adjacent the confining rings is at essentially the same high temperature as the rings. Poor gas return flow results which severely limits the power output capabilities of the laser.

Accordingly, it is an object of the present invention to provide a gas ion laser which is simple, light, rugged and durable, and at the same time is operable at higher power levels than otherwise comparable lasers of the prior art.

It is a further object of the invention to provide a gas ion laser wherein the laser discharge confining elements are maintained at considerably lower temperatures than in the prior art.

It is a still further object of the invention to provide a gas laser which, in addition to the foregoing, is relatively inexpensive to fabricate and highly reliable and efficient in operation.

A gas ion laser according to the invention comprises a hermetically sealed elongated enveloping assembly including a cathode containing housing adjacent one end, a tubular anode adjacent the other end, and at least one elongated cylindrical body of electrically insulating material disposed between the cathode housing and the anode. The cylindrical body is in hermetically bonded relationship with the cathode housing and with the anode and forms an outer wall of the enveloping assembly. The cylindrical body defines a discharge confining axial longitudinal bore as well as at least one gas return off-axis longitudinal bore. The discharge confining and gas return bores are in gas communicating relationship with one another in the vicinity of the cathode housing and in the vicinity of the anode. The enveloping assembly includes means transparent to laser energy at at least one end thereof and contains an ionizable gas capable of undergoing laser action. A tubular member is coaxially disposed about the cylindrical body and is radially spaced from the outer lateral surface thereof to define an annular passageway therebetween. A coolant is passed along this passageway in direct contact with the outer lateral surface of the cylindrical body.

Additional objects, advantages and characteristic features of the invention will become readily apparent from the following detailed description of a preferred embodiment of the invention when considered in conjunction with the accompanying drawing in which:

FIG. 1 is a longitudinal view, primarily in section, illustrating a laser according to the invention;

FIG. 2 is a cross-sectional view of the interior portion of the laser of FIG. 1 as taken along line 2—2; and FIG. 3 is a sectional view taken along line 3—3 of FIG. 2.

Referring to FIG. 1 with greater particularity, a gas ion laser according to the invention may be seen to include an elongated discharge section 10 mounted between a cathode 12 and an anode 14. The discharge section 10 contains a gaseous laser medium which may be any ionizable gas capable of undergoing laser action when a suitable DC voltage is applied between the cathode 12 and the anode 14. However, the laser medium is typically a noble gas such as argon, krypton, or neon, argon being preferred.

In the laser of FIG. 1 the discharge section 10 consists of at least one elongated cylindrical body which functions as both a discharge confining element and a hermetic enveloping element for the laser. Although a single elongated cylindrical body extending from the vicinity of the cathode 12 to the anode 14 may be employed to form the discharge section 10, due to ease of fabrication it is preferred to form the discharge section 10 of a plurality of individual elongated cylindrical bodies such as 16a, 16b, 16c, 16d, and 16e successively disposed along the longitudinal axis of the laser and in hermetically bonded relationship with one another.

As may be seen from FIGS 2 and 3, each cylindrical body 16 defines an axial longitudinal bore 18 for confining the laser discharge and further defines at least one off-axis longitudinal bore 20 for providing a gas return path. Although any practical number of gas return bores may be employed, for purposes of illustration two such bores 20 are shown in FIGS. 2 and 3 at diametrically opposite locations with respect to the axial discharge bore 18. The diameter of each gas return bore 20 is preferably made slightly less than that of the discharge confining bore 18 in order to insure that the discharge will occur in the bore 18 and not in the bores 20. For example, the diameter of the gas return bores 20 may be essentially in the range of from 0.8 to 0.9 that of the discharge confining bore 18. When argon is used as the laser medium, the diameter of the discharge confining bore 18 typically may be in the range of essentially from 1.5 to 3.0 mm, with the overall length of the discharge section 10 ranging essentially from 15 to 50 cm.

As is shown in FIG. 1, the discharge confining bore 18 of the body 16a located nearest the cathode 12 is tapered outwardly as shown at 22 as the cathode is approached in order to reduce ion bombardment on the lateral surface of the bore 18. The discharge confining bore 18 of the body 16e located nearest the anode 14 may be similarly provided with an outwardly extending tapered portion 24 as the anode 14 is approached.

The discharge confining and gas return bore defining cylindrical bodies 16 should be made of electrically insulating material having good thermal conductivity and thermal shock resistant properties. Exemplary materials which may be used as beryllia, alumina and quartz. However, beryllia is preferred on account of its greater resistance to thermal shock and ion bombardment.

As was mentioned above, when the discharge section 10 is formed of a plurality of cylindrical bodies 16, the facing end surfaces of each pair of adjacent bodies 16 are bonded together so as to form a hermetic seal for the bores 18 and 20 therein. As shown in FIGS. 2 and 3, bonding material 26 is disposed between and bonded to the facing end surfaces of cylindrical bodies 16a and 16b. The bonding material 26 may be a braze material such as copper, with the resultant bond being formed by conventional metallizing and brazing techniques. Alternatively, the bonding material 26 may be a lead solder glass such as that sold under the trade names Corning 7570 and 7575 by Corning Glass Works. Since brazed joints are usually of higher strength than those formed with solder glass, brazed joints are normally employed when dielectric fluid is used as the laser coolant. On the other hand, solder glass joints are normally used when the laser coolant is water, since solder glass is highly resistant to electrolysis.

As may be seen from FIGS. 2 and 3, in a preferred embodiment of the invention the bonding material 26 surrounds the space between adjacent gas return bores 20 as well as the space between adjacent discharge confining bores 18. This precludes gas communication between the bores 18 and 20 in the space between adjacent cylindrical bodies such as 16a and 16b. Such bore isolation enables the operating laser gas pressure to be increased by approximately a factor of two over that which would otherwise be achievable, thereby reducing any tendency toward arc discharge instability. In addition, the bore isolation permits laser operation at higher discharge currents without saturation, enabling higher power operation. In forming the bonds between adjacent cylindrical bodies 16, it is preferable that the inner radial extent of the bonding material 26 between the bores 18 and 20 terminates radially outwardly of the periphery of the bores 18, as shown in FIGS. 2 and 3, since this reduces any tendency for ion bombardment on the bonding material 26.

Referring again to FIG. 1, cathode 12 is mounted in a cylindrical housing 30 in axial alignment with the discharge confining bore 18. The cathode 12 may be of a helical configuration, as shown, to permit the generated laser beam to pass axially therethrough. The cathode housing 30 may be of metal or of a ceramic material such as beryllia or alumina. The end wall of the housing 30 adjacent the discharge section 10 extends radially inwardly into contact with the bore defining body 16a and is hermetically bonded to the end of the body 16a, for example in the manner discussed above with respect to the bonding of the bodies 16a and 16b. The end wall of the housing 30 adjacent the body 16a defines a central aperture 32 of a radius not less than the distance from the axis of bore 18 to the outer edge of each bore 20 in order to permit gas flow between the cathode chamber and the bores 18 and 20.

The end of the cathode housing 30 remote from the discharge section 10 is hermetically bonded to a header 34 which may be of a metal such as Kovar, for example. Electrical leads 36 and 38 to the cathode 12 extend through the header 34 and are insulated therefrom by means of insulating beads 40 and 42, respectively. Header 34 defines an outwardly extending tubular portion 44 axially aligned with the discharge confining bore 18. A glass tube 46 aligned with the header extension 44 has its inner end hermetically sealed to the extension 44 and its outer end hermetically sealed to a Brewster angle window 48.

Header 34 is also provided with a gas pumping tube 49 which may be of copper, for example. During fabrication of the laser, the outer end of tube 49 is connected to vacuum pumping apparatus for initially evacuating the interior portions of the laser, after which the tube 49 is connected to a source of the desired gaseous laser medium to fill the interior portions of the laser with laser gas at the desired pressure. As an example, when argon is used as the laser gas, typical gas pressures within the laser would range from essentially 0.5 to essentially 2.0 Torr. After the completion of the gas filling operation, the outer end of tube 49 is sealed off, as shown, to complete the vacuum envelope for the laser and enable the desired laser gas pressure to be maintained.

At the end of the discharge section 10 remote from the cathode 12, tubular anode 14, which may be of a metal such as copper for example, is hermetically bonded to the bore defining body 16e. This bond may be achieved by providing aligned circumferential indentations in the adjacent outer lateral surfaces of the anode 14 and the body 16e and brazing a metal attaching ring 50, of Kovar for example, to the anode 14 and the body 16e. A metal tube 52, which also may be of Kovar for example, may be brazed to the outer end of the anode 14 to form a coaxial extension of the anode 14. A glass tube 54 aligned with the metal tube 52 is hermetically sealed between the outer end of the tube 52 and Brewster angle window 56.

In order to reduce ion bombardment on the walls of the discharge confining bore 18 and thereby increase the operating efficiency of the laser, a magnetic field may be provided along the axis of the discharge section 10. The axial magnetic field may be generated by means of a solenoid 60 coaxially mounted about the cylindrical bodies 16a–16e. However, other magnetic field generating arrangements such as permanent magnets or periodic permanent magnetic structures could be employed instead. Or, where lower efficiencies may be tolerated no magnetic field need be applied at all. In the illustrative arrangement shown in FIG. 1, solenoid 60 is housed in a can 62 of ferromagnetic material which provides a magnetic field return path for the solenoid 60. Ferromagnetic pole pieces 64 and 66 are disposed at the cathode and anode ends, respectively, of the solenoid 60. A metal tube 68, of stainless steel for example, is attached to the inner lateral surface of the solenoid 60 and is coaxially disposed about the discharge section 10. The inner diameter of the tube 68 is greater than the outer diameter of the cylindrical bodies 16 so as to provide an annular passageway 70 for the flow of a coolant over the outer lateral surfaces of the cylindrical bodies 16 as will be discussed in more detail below.

The solenoid can 62 has a diameter greater than that of the cathode housing 30 and extends outwardly of the housing 30 to a longitudinal location near the region where the housing 30 is bonded to the header 34. The can 62 may be provided with an annular flange 72 which extends radially inwardly from the can 62 to the housing 30 in the vicinity of the header 34. Flange 72 retains an O-ring 74 of resilient material, such as butyl rubber for example, for forming a fluid tight seal with the outer surface of housing 30. An annular end cap 76 may be attached to the outer end of the can 62 and the header 34 in order to preclude axial movement of the solenoid can relative to the interior parts of the laser.

At the end of solenoid 60 adjacent the anode 14 a tubular member 78 of electrically insulating material such as nylon is coaxially disposed about the anode 14. The inner end of member 78 is attached to pole piece 66 while the outer end of member 78 is provided with a flange 80 which extends radially inwardly to the outer lateral surface of the anode 14. Flange 80 retains an O-ring 82 for providing a fluid tight seal between the member 78 and the anode 14.

In order to facilitate the introduction and removal of coolant for the coolant channel 70, the solenoid can 62 and the tubular member 78 may be provided with outwardly extending coolant conduits 84 and 86, respectively. Suitable coolants which may be employed with a laser according to the invention are forced air, water, or dielectric fluids such as FC-75 (a fluorocarbon fluid sold by Minnesota Mining and Manufacturing Co.) or Coolanol 25 (a silicate ester oil coolant sold by Monsanto Co.). In order to provide extended surfaces of contact with the coolant, longitudinal or helical cooling fins (not shown) of a material of high thermal conductivity may be attached to the outer lateral surface of the bodies 16.

In the operation of a laser according to the invention, an electrical discharge may be initiated in the section 10 by applying either a high voltage pulse (e.g. around 3 Kv) or a large DC voltage (e.g. around 2 Kv) between the anode 14 and the cathode 12. After the discharge has commenced, a DC voltage ranging from around 100 to 300 volts applied between anode 14 and cathode 12 will normally be sufficient to sustain the discharge. During steady state operation typical anode-cathode current flow may be around 50 amperes, for example. This electrical discharge excites the laser gas to a condition of stimulated emission, producing laser energy along the axis of the laser. The laser may be operated as an amplifier as shown, or as an oscillator by locating suitable reflectors at opposite ends of the laser.

As the laser operation proceeds, laser gas is transferred along the discharge section 10 from the vicinity of the cathode 12 toward the vicinity of the anode 14 through the discharge confining bore 18. However, this gas is readily returned to the vicinity of the cathode 12 via the gas return bores 20, thereby minimizing the pressure differential throughout the discharge region and enabling the laser to operate in a stable and efficient manner.

During operation, heat is removed from the bore defining cylindrical bodies 16 by the coolant which traverses the coolant channel 70 from input conduit 84 to output conduit 86 in direct contact with the outer lateral surface of the bodies 16. This not only enables maximum cooling of the discharge bore 18, but it also allows the gas return bores 20 to be maintained at considerably lower temperature than in housed confining ring return flow arrangements of the prior art. For example, whereas the returning gas in such prior art arrangements is typically at the temperature of the confining rings which is usually around 1,000° C., the returning gas in the bores 20 of a laser according to the present invention may be maintained at a temperature as low as about 100° C.

Vastly improved gas return results which significantly increases the power output capabilities of the laser. For example, in contrast with power levels of around 50 watts per cm of active discharge length achieved with the aforementioned housed confining-ring prior art arrangements, lasers according to the present invention have been operated at power levels in excess of 200 watts per cm of active discharge length, and operation at power levels as high as 1,000 watts per cm of active discharge length are believed to be readily achievable.

An additional advantage afforded by lasers according to the present invention is that during fabrication of the laser the vacuum enveloping assembly may be subjected to high temperature processing techniques conventionally employed in the fabrication of microwave tubes, after which this assembly can be readily installed in a magnetic field generating arrangement to provide the completed laser. These fabrication techniques are efficient and inexpensive and provide a reliable, compact, long life product.

Although the present invention has been shown and described with respect to a particular embodiment, nevertheless various changes and modifications obvious to a person skilled in the art to which the invention pertains are deemed to lie within the purview of the invention.

What is claimed is:

1. A gas laser comprising:

a hermetically sealed elongated enveloping assembly including a cathode containing housing adjacent one end, a tubular anode adjacent the other end, and a plurality of axially aligned elongated cylindrical bodies of electrically insulating material successively disposed between said cathode housing and said anode in hermetically bonded relationship with one another and with said cathode housing and said anode, said bonded cylindrical bodies forming an outer wall of said enveloping assembly, each said cylindrical body defining an axial longitudinal bore therethrough aligned with the said axial longitudinal bore of each other said cylindrical body, each said cylindrical body further defining at least one off-axis longitudinal bore therethrough in gas communicating relationship and aligned with the said off-axis longitudinal bore of each other said cylindrical body, the axial longitudinal bores being in gas communicating relationship with the off-axis longitudinal bores in the vicinity of said cathode and in the vicinity of said anode, bonding material disposed between and bonded to the facing end surfaces of adjacent ones of said cylindrical bodies in a manner precluding gas communication between the off-axis longitudinal bores and the axial longitudinal bores therein in the space between said adjacent cylindrical bodies;

said enveloping assembly further including laser energy transparent means at at least one end thereof and containing an ionizable gas capable of undergoing laser action;

tubular means coaxially disposed about said bonded cylindrical bodies and radially spaced from the outer lateral surface thereof to define an annular passageway therebetween; and means for passing a coolant along said passageway in direct contact with said outer lateral surface of said bonded cylindrical bodies.

2. A gas laser according to claim 1 wherein said bonding material is a braze material.

3. A gas laser according to claim 1 wherein said bonding material is a solder glass.

* * * * *